United States Patent [19]
Le Testu et al.

[11] Patent Number: 4,744,123
[45] Date of Patent: May 17, 1988

[54] DEVICE FOR SCRAPING THE OUTER SURFACE OF A TUBE

[75] Inventors: Patrick Le Testu, Saint Pierre d'Irube; Dominique Pfeiffer, Nanteuil le Haudoin; Michel Cochetel, Savigny sur Orge; Jean-Michel Longeau, Villeneuve sur Yonne, all of France

[73] Assignees: Gaz de France, Paris; Sensco S.A.R.L., Sens, both of France

[21] Appl. No.: 907,427

[22] Filed: Sep. 15, 1986

[30] Foreign Application Priority Data

Sep. 19, 1985 [FR] France .................. 85 13902

[51] Int. Cl.⁴ .............................................. B08B 9/02
[52] U.S. Cl. .................................... 15/104.04; 15/88; 82/4 R
[58] Field of Search ............... 15/88, 104.04; 29/81 G, 29/DIG. 7; 82/4 C, 4 R; 99/588, 590, 593; 242/72.1, 72 R; 407/62, 113

[56] References Cited

U.S. PATENT DOCUMENTS

| | | | |
|---|---|---|---|
| 2,861,608 | 11/1958 | Brown | 82/4 R |
| 3,075,219 | 1/1963 | Ott | 15/104.04 |
| 3,171,309 | 3/1965 | Cloutier . | |
| 3,288,004 | 11/1966 | Brown | 82/4 R |
| 3,811,347 | 5/1974 | Heckhausen | 82/4 R |
| 3,965,570 | 6/1976 | Kozulla | 82/4 R |

FOREIGN PATENT DOCUMENTS 406353 12/1967 Australia .
338757 7/1959 Switzerland .
821862 10/1959 United Kingdom .

Primary Examiner—Harvey C. Hornsby
Assistant Examiner—Corinne M. Reinckens
Attorney, Agent, or Firm—Pollock, VandeSande & Priddy

[57] ABSTRACT

A device for shaving material from the outer surface of a pipe including a chuck for securing the device to the end of the pipe, a drive shaft having its axis coincident with the pipe axis and a fixed plate immovably secured to the drive shaft perpendicular thereto. A cutting unit for scraping the outer surface of the pipe is secured to an arm which extends parallel to the drive shaft, and the arm is secured to a disc which is movably secured to the fixed plate, thus permitting radial adjustment of the cutting unit.

5 Claims, 1 Drawing Sheet

U.S. Patent
May 17, 1988
4,744,123
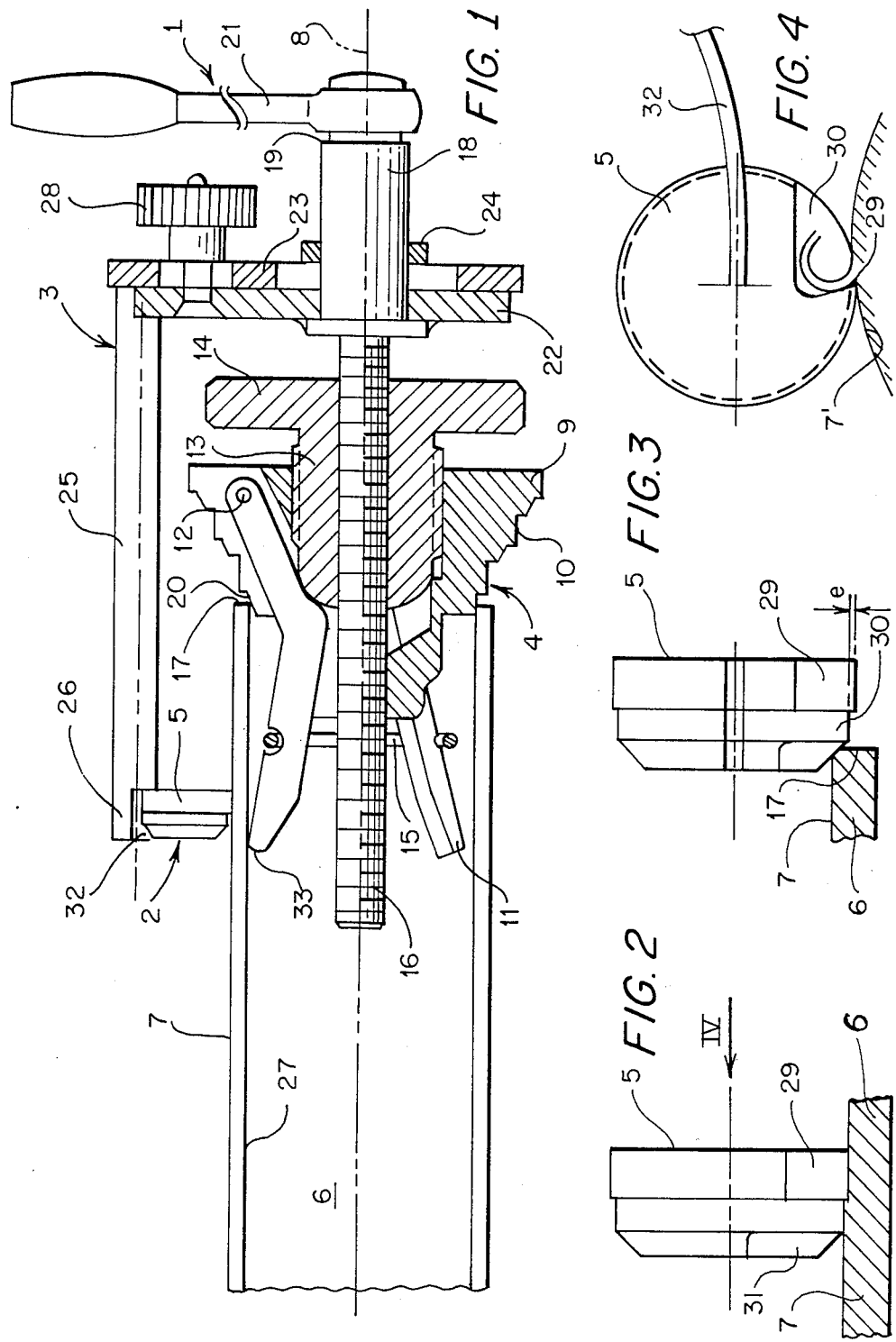

DEVICE FOR SCRAPING THE OUTER SURFACE OF A TUBE

The invention concerns a device for scraping at least part of the outer surface of the end of a cylindrical pipe having a circular or reasonably circular section, particularly of pipes made of plastic, for example of the polyethylene, polyvinyl chloride (PVC), or other types of plastic.

This device is more particularly intended to prepare surfaces, for example those of pipes before their assembly, especially by welding onto a connecting sleeve.

Especially because of the sometimes long storage of pipes, their surface is often rusted. Hence before they can be assembled the layer of oxidized matter must be eliminated.

To this end, current technique involves using in particular an abrasive powder. However, its use is not recommended, as the surface obtained after this powder has acted makes it impossible to ensure a sufficiently reliable assembly. In addition, it may prove dangerous to use.

A scraper may also be used to effect said preparation, the operation being done manually. This process is clumsy. In addition, it requires adequate space around the pipe (which may be placed in a trench) to make it possible to do the scraping. It should also be noted that the prepared surface must be cleaned off as completely as possible, assembly being all the more reliable when the surfacing operation is properly done.

Likewise, as revealed in document U.S. Pat. No. 3,171,309, it is also possible to use a scraping device of the type having a centering chuck supported inside the pipe to be surfaced by means of pads, a unit for scraping the outer surface of the pipe, and means for adjusting and positioning this scraping unit in relation to the pipe's axis.

However, in such a device, with the scraping-unit tool moving along the surface of the pipe according to a virtually constant radius, it is unable to absorb any of the pipe's extra thick portions or defective ovalization. In other words, this device does not make it possible to lift off a shaving of an essentially constant thickness regardless of the pipe's deformations (deflection, ovalization, defective thickness).

The invention is intended to resolve this problem and is for a scraping device whose tool consists of a scraper blade, a feeler, and/or a bevelling blade.

Advantageously, according to the invention, the tool is driven in rotation around said pipe by means of a spring plate.

In this way, the tool is held elastically throughout the scraping operation against the pipe surface and can effectively absorb any of its defects.

The invention, its characteristics and advantages will appear more clearly with the aid of the following description, given in reference to the attached drawings, in which:

FIG. 1 diagrammatically shows the scraping device along a lengthwise cross-section;

FIG. 2 diagrammatically shows the scraping tool during a surfacing operation;

FIG. 3 shows the scraping tool at the start of operation;

FIG. 4 diagrammatically shows a view along IV of the tool shown in FIG. 2.

Referring to FIG. 1, the scraping device, viewed in its entirety 1, includes at least:

one scraping unit 2, placed near the outer surface 7 of the pipe 6, and including a tool 5, an expansible chuck 4 extending towards the inside of the pipe 6, essentially in the axis 8 of the latter, and a maneuvering and adjustment unit 3, holding the scraping unit 2 and its mechanical connection to the centering chuck 4 of the operating and adjustment unit 3 in the axis 8 of the pipe.

The chuck 4 in particular includes a cone 9 having steps 10, 20, the adapted step fitting by force along the axis 8 towards the inside of the end 17 of the pipe, thus blocking the cone 9 from rotating and translating relation to the pipe 6. Several bent support arms 11 are attached mechanically to the cone 9. In the example shown in FIG. 1, the chuck 4 has three support arms 11, arranged angularly basically at 120° to one another, which pivot around their axis 12. When the chuck 4 is attached to the pipe 6, the arms 11 extend towards the inside of the pipe 6 and rest, at 33, against the inner wall 27 of said pipe. In addition, a return system itself known, for example of the spring type, makes it possible at the end of the operation to bring the arms 11 back to a resting position, that is, to disengage them from the support points 33.

A buffer 13 to separate the arms 11, equipped with an operating wheel 14, passes essentially axially through the central part of the cone 9. The buffer 13, which cooperates with the return system 15, allows the arms 11 to be positioned in the pipe 6, adjusting the force of their support against the wall 27. The wheel 14, accessible manually, may take the form of a handle, a levered control cam, or any other adapted control part.

The operating and adjustment unit 3, which ensures that the scraping unit 2 and its attachment with the chuck 4 are held in place, includes a drive shaft 16 extending from a core 18 towards the inside of the pipe 6 through the central part of the buffer 3. When the chuck 4 is attached to the pipe 6, the drive shaft 16 and the core 18 are situated basically coaxially to the pipe. The core 18 has at its end 19 an impression allowing it to take a control lever 21. The lever 21 may be of the wheel type or any other adapted control part. Onto the core 18, and basically perpendicular to it, a plate 22 is affixed rigidly, for example by welding. Against the plate 22 slides a sliding disk 23. The disk 23 is held against the plate 22 by a holding device 24, for example of the ring type. The sliding disk 23 allows the scraping unit 2 to be positioned at a determined radial distance from the axis 8 of the pipe 6. The scraping unit 2 is connected to the sliding disk 23 by means of an arm 25, which extends outside the pipe 6, basically parallel to its axis 8. The scraping unit 2, located towards the end 26 of the arm 25, is thus cantilevered when the scraping unit 2 is not in operation, that is, when the tool 5 is not bearing against the wall 7 of the pipe 6. The securing device 28, of the screw or spring button type, for example, ensures the positioning of the disk 23 in relation to the plate 22 and thus fixes the adapted radial distance so as to effect the scraping operation.

With reference now to FIGS. 2 and 3, it is noted that the tool 5 of the scraping unit 2 includes a scraper blade 29, a feeler 30, and/or a bevelling blade 31. These three elements may constitute a single block or be arranged one behind the other to form several distinct parts; during operation, the feeler 30 permanently rests against the raw, i.e., unprepared surface of the outer periphery 7 of the pipe 6. Should the tool 5 be equipped with a bevelling blade 31, this is preferably placed against the feeler 30. A spring 32, attached both to the arm 26 and to the tool 5, ensures that the tool 5 has a certain elasticity during the scraping operation (FIG. 4).

The device described above operates as follows:

The scraper unit 2 is placed at a determined radial distance in relation to the axis 8 of the pipe 6 so as to facilitate the positioning of the device 1.

The unit 2 is made solid with the pipe 6 by means of a chuck 4 and through the operating and adjustment unit 3. To this end, after having basically fit one of the steps 10, 20 of the stepped cone 9 into the pipe 6, the buffer 13, which is threaded, is screwed into the cone 9, which has a threading toward its center, by means of the operating wheel 14. Thus the buffer 13 pushes the bent arms 11, which causes them to rest against part of the inner surface 27 of the pipe 6.

The scraping unit 2 is brought against the outer surface 7 of the pipe 6, causing the disk 23 to slide on the fixed plate 22. This position is maintained by means of the securing device 28. In order to place the tool 5 on the determined area of the surface to be scraped, the shaft 16 is disengaged, i.e., separated, from the buffer 13, which makes it possible to free up the lengthwise movement, essentially along the axis 8, of the tool 5. When the position is fixed, the shaft 16 is again engaged onto the buffer 13. The connection between the buffer 13 and the shaft 16 allowing the engagement and disengagement of these two parts is in itself known and has not been represented.

Said unit 2 is moved along the surface to be scraped of the outer periphery 7 of the pipe 6. The tool 5 is driven in rotation around the pipe 6 by means of the drive shaft 16, essentially coaxial to the pipe. With each turn of the tool 5, the shaft 16 is moved in a direction making it possible to move the tool towards a new area to be scraped.

The shaft 16 is threaded, and moves inside a threading provided to this end in the buffer 13, and the tool 5 moves in a simultaneous movement of translation and rotation around the axis 8 of the pipe 6.

If the tool 5 is provided with a bevelling blade 31, it is advantageous to position the bevelling blade 31 at the start of the scraping operation against the end 17 of the pipe 6. In this case, the surfacing of the end 17 will be done towards the pipe 6 (the threading of the shaft 16 having been provided to this end).

It is quite obvious that the handle 21 is manipulated throughout the operation. This handle makes it possible at least to rotate the shaft 16 and the tool.

During the surfacing, the blade 29 penetrates the outer surface 7 of the pipe 6 and rests against the scraped surface 7'. The feeler 30 makes it possible to maintain a penetration e having a constant cross-section while resting against the unscraped surface 7 throughout the entire scraping operation.

When the scraping operation is finished, i.e., when the desired length of surfacing has been accomplished, the tool 5 is lifted off by loosening the securing device 28 and causing the disk 23 to slide along the plate 22. The chuck 4 can then be unblocked and disengaged by folding back the arms 11. To this end the buffer 13 is unscrewed by means of the operating wheel 14. The device 1 can then be lifted off the pipe 6.

It goes without saying, as can be seen from the preceding, that the invention is not limited solely to the mode of realization and application that has more especially been envisaged. In particular, a variant may be conceived in which the operating handle 21 is of the ratchet-wrench type, known in itself. This assembly in particular makes it possible to limit the space necessary to the user to operate the device. In fact, this wrench allows unidirectional operation.

In addition, should the shaft 16 be threaded, the pitch of the threads (and that of the cooperating threading formed on the buffer 13) is adapted so that there is a partial overlapping at each turn of the device between the scraped area and the area to be scraped, with the tool 5 moving basically according to a constant-pitch helix.

In this way, one avoids leaving intermediate, unscraped surfaces in the area where the surfacing operation is to be effected.

Finally, it should be noted that the bevelling blade 31, positioned at the start of the operation towards the end 17 of the pipe 6, makes it possible to obtain an adapted angle of attack, thus improving in particular the subsequent connecting of two cooperating pipes and their introduction into a connecting sleeve.

In other words, the bevelling blade in general has an effect only at the start of the operation and allows a pre-fitting of the pipe 6 towards its end 17 (FIG. 3). During the surfacing operation, only the blade 29 does the scraping of the pipe 6 at depth having a cross-section e, adjusted by the feeler 30 (FIG. 2).

So as to allow the tool 5 to be positioned towards the end 17 of the pipe 6 and the start of the scraping operation, adequate space is provided; in particular, the steps 10, 20 of the cone 9 are formed appropriately.

We claim:

1. A device for scraping at least a portion of the outer circumferential surface at and near the end of a pipe having a circular or essentially circular cross-section, said device comprising:
   an expansible chuck for coaxially securing said device at said end of said pipe;
   a drive shaft coaxially mounted on said chuck;
   a plate member immovably secured to and perpendicular to the axis of said drive shaft;
   a movable disc member movably mounted adjacent to and parallel to said plate member;
   securing means for securing said disc member to said plate member in a plurality of radially adjustable positions;
   operating and adjustment means secured to said disc and extending essentially parallel to said drive shaft for placement near said outer surface of said pipe; and
   scraping means mounted on said operating and adjustment means, said scraping means comprising a scraping blade, feeler means for contacting the outer surface of said pipe, and a bevelling blade for bevelling said end of said pipe.

2. A device according to claim 1, wherein said scraping means is interconnected with said operating and adjustment means by a spring blade.

3. A device according to claim 1, wherein said expansible chuck comprises:
   a stepped cone for axial alignment within said pipe;
   a plurality of bent support arms mounted on said cone for pressing against the inner surface of said pipe; and
   a buffer axially mounted on said drive shaft for forcing said bent arms outwardly against the inner wall of the pipe.

4. A device according to claim 3 characterized by the chuck having three support arms arranged angularly essentially at 120° from one another.

5. A device according to claim 1 characterizd by the drive shaft being controlled by a unidirectional operating handle.

* * * * *

UNITED STATES PATENT AND TRADEMARK OFFICE
CERTIFICATE OF CORRECTION

PATENT NO. : 4,744,123

DATED : May 17, 1988

INVENTOR(S) : Patrick Le Testu, et al.

It is certified that error appears in the above-identified patent and that said Letters Patent is hereby corrected as shown below:

Column 2, line 14, after "translating" insert --in--.

Column 4, line 65, change "characterizd" to --characterized--.

Signed and Sealed this

Eighth Day of November, 1988

Attest:

DONALD J. QUIGG

*Attesting Officer*    *Commissioner of Patents and Trademarks*